Patented Mar. 18, 1947

2,417,675

UNITED STATES PATENT OFFICE 2,417,675

CRYSTALLINE OLEFIN-NITROSYL CHLORIDE ADDITION PRODUCTS AND PROCESS FOR MAKING THEM

Leland James Beckham, Geddes, N. Y., assignor to The Solvay Process Company, New York, N. Y., a corporation of New York No Drawing. Application May 21, 1943, Serial No. 487,974

18 Claims. (Cl. 260—647)

This invention relates to new compositions of matter and to processes for preparing them. More specifically the invention relates to new crystalline addition products of nitrosyl chloride with olefin hydrocarbons, and to processes for their preparation.

It was known heretofore that certain olefins will react with nitrosyl chloride to form addition products. For example, isobutene and trimethyl ethylene were known to react with nitrosyl chloride to yield crystalline addition products which were generally considered to be bis-nitroso-chlorides. However, it was heretofore believed that this reaction was restricted to olefins of special structural form. Thus, according to Tilden and Forster (Jour. Chem. Soc. 65 (1894) page 334) olefins in which the double bond occurs in an allyl group: $-CH_2-CH=CH_2$ do not combine with nitrosyl chloride; and according to Ipatieff (British Chem. Abstracts 82, Sec. 1 (1902), pages 1 and 2) olefins having the configuration $-CH=CH-$ or $-CH=CH_2$, and $>C=CH_2$ (except isobutene) do not form crystalline reaction products with nitrosyl chloride.

I have made the discovery that propylene and ethylene can react with nitrosyl chloride in such a manner as to form colorless crystalline bis-nitroso-chlorides. The ethylene derivative has a melting point of 71° to 72° C., and the propylene derivative has a melting point of 91° to 92° C. These novel products may be employed in the synthesis of numerous useful compounds by virtue of the reactivity of the chlorine atom and of the adjacent nitroso or bis-nitroso group contained therein.

The discovery that colorless crystalline bis-nitroso chlorides can be prepared by reaction of propylene or ethylene with nitrosyl chloride is surprising not only in view of the aforesaid disclosures of Tilden and Forster and of Ipatieff, but also in view of the failure of an attempt by Tilden and Sudborough (Jour. Chem. Soc. (1893) pages 479–481) to obtain crystalline addition products from reaction mixtures formed by reacting ethylene and propylene with nitrosyl chloride, either by bubbling the olefin through liquid nitrosyl chloride at a temperature of about —10° C., or by passing a gaseous mixture of the olefin and nitrosyl chloride through a condenser surrounded with ice and salt. The only reaction products obtained according to this disclosure were ethylene dichloride, and a mixture of liquid nitroso-chlor derivatives of propylene and propylene dichloride.

It has been found according to this invention that the aforesaid crystalline nitrosyl chloride addition products can be obtained by reacting an olefin having a maximum of 3 carbon atoms (i. e., propylene or ethylene) with nitrosyl chloride, at a temperature from —25° to 60° C., in the liquid phase, and in the presence of a volatile saturated halogenated hydrocarbon as a solvent and crystallizing the nitrosyl chloride addition product from the reaction mixture, e. g. by concentrating the less volatile constituents of the reaction mixture, and cooling the concentrated mixture to effect crystallization. As an additional feature of the invention, it has been discovered that the reaction of the aforesaid olefins with nitrosyl chloride can be influenced to produce an increased yield of the crystalline addition products, by the presence of a catalyst, particularly metallic nickel or a heavy metal chloride of a certain class (for instance, nickel chloride, ferric chloride or cuprous chloride) either in the free state or in the form of its complex nitrosyl chloride addition product.

In carrying out the process according to this invention, nitrosyl chloride is reacted with the olefin hydrocarbon in the liquid phase, and preferably under superatmospheric pressure, at temperatures from about —25° to about 60° C., in the presence of a volatile saturated halogenated hydrocarbon serving as a common solvent for the olefin and nitrosyl chloride, and preferably in the presence of a catalyst of the group indicated above. When the reaction is complete, the relatively non-volatile constituents of the mixture are concentrated, for instance by evaporation of the relatively volatile constituents thereof, and the residue is cooled to effect crystallization of the bis-nitroso chloride. The latter is separated from the mother liquor, for example by filtration and washing. In order to facilitate crystallization, it is preferable to employ substantially pure ethylene or propylene.

The solvent used as the reaction medium may be any one or more of the volatile halogenated hydrocarbons which are saturated (i. e., free from unsaturated carbon atoms) and which are liquid under the conditions of the reaction; such as, for instance, methyl chloride, methyl bromide, dichloro-fluoromethane, the dichloro-ethanes (ethylene chloride and ethylidene chloride), and the polychlormethanes. The chlorinated hydrocarbons of this class, especially the polychlormethanes (i. e., methylene chloride, chloroform and carbon tetrachloride), are preferred.

The reaction can be carried out at atmospheric pressure or at superatmospheric pressure, depending upon the other conditions of operation. At temperatures within the lower portion of the above range (e. g., at temperatures below 0° C.), the reaction can be carried out at atmospheric pressure, provided the solvent used is liquid under such conditions.

Optimum results are obtained at reaction temperatures within the range of about 20° to about 40° C. Since this preferred temperature range is well above the boiling point of nitrosyl chloride and of the aforesaid olefins, the reaction within this preferred temperature range is carried out under superatmospheric pressure.

The proportions of the reagents are preferably chosen such that at least one mol of olefin is present for each mol of nitrosyl chloride. While a molecular excess of the olefin can be employed, no material advantage results thereby. The proportion of inert solvent can be such as to constitute about 5 to about 100 parts by volume for each part by weight of nitrosyl chloride, one part by volume being equivalent to the volume of one part by weight of water at the same temperature.

In order to obtain optimum yields of the crystalline bis-nitroso chlorides, the reaction is carried out in the presence of metallic nickel as a catalyst. For instance, it has been found advantageous to carry out the reaction in a nickel bomb capable of withstanding the pressures attained during the reaction. Alternatively, a reaction vessel of some other material, such as glass, may be used, and metallic nickel added thereto. Under the preferred conditions of temperature, pressure and concentration referred to above, propylene yields a crystalline bis-nitroso chloride in the absence of any catalytic material, but the yields are relatively low as compared with those produced in the presence of a catalyst. Catalytically active nickel, as distinguished from ordinary metallic nickel, results in a higher yield of crystalline bis-nitroso chloride even at temperatures outside the preferred range.

As indicated above, it has further been found that certain heavy metal chlorides, especially nickel chloride, ferric chloride and cuprous chloride also exert a desirable catalytic effect upon the reaction, although they are generally inferior to metallic nickel for the purpose of increasing the yield of the crystalline addition products. They may be employed in relatively small proportions in the reaction mixture, either in the solid state or in the form of a solution of a nitrosyl chloride complex in the reaction mixture. The solution of metal chloride-nitrosyl chloride complex can be obtained by introducing nitrosyl chloride into a small quantity of a solvent of the type referred to above, adapted to serve as the reaction medium, in the presence of the metal chloride. A saturated solution of the metal chloride-nitrosyl chloride complex is formed, and can then be introduced into the reaction zone prior to introduction of the olefin. The presence of the aforesaid metal chlorides generally decreases the formation of colored impurities during the reaction.

The duration of the reaction depends upon the temperature, pressure, concentration of the reagents, and activity of the catalyst, and varies over a wide range. For instance, periods as short as 10 minutes or as long as 32 hours can be employed. In general, periods of the order of one-half to three hours are preferred. The rate of reaction of ethylene with nitrosyl chloride is about 1/5 of the rate of the reaction of propylene under similar conditions; hence, a correspondingly longer reaction period is required for optimum yields in the case of ethylene.

In order to recover the crystalline addition product after the reaction is complete, the reaction mixture is concentrated by removing its relatively volatile constituents (for instance by evaporating at a temperature of the order of about 25° C., under reduced pressure if need be), and the residue is cooled to effect crystallization (for instance, by means of an ice bath). The crystalline product which separates from the mother liquor may be recovered by filtration in the form of a filter cake, and the latter can be washed with cold 80% ethanol (e. g., at about 0° C.). The resulting crystalline bis-nitroso chloride may be recrystallized, if desired, from carbon tetrachloride to increase its purity.

The process will be more readily understood from the following examples in which temperatures are in degrees centigrade and parts are by weight.

*Example 1*

150 parts of dry chloroform are introduced into a nickel bomb under conditions excluding atmospheric moisture, and the contents of the bomb are indirectly cooled by means of "dry ice" (solid carbon dioxide). 12.6 parts (0.3 mol) of propylene are introduced under pressure into the bomb through a flow meter, and 6.5 parts (0.1 mol) of liquid nitrosyl chloride are then added. The bomb is sealed, and then warmed rapidly to a temperature of 40°. This temperature is maintained for a period of about 30 minutes, and the bomb is shaken frequently to establish equilibrium between the liquid and vapor phases. At the end of this period the bomb is cooled and the pressure released.

The reaction products are concentrated by distilling off the chloroform at 25° under reduced pressure. The blue-green liquid which remains is cooled in an ice bath for at least one hour. The crystalline material which separates is recovered by filtration in the form of a filter cake, and the latter is washed with ice cold 80% ethanol. The resulting product is bispropylene nitroso chloride. If desired, it can be recrystallized from carbon tetrachloride. A pure white crystalline product can be recovered in this manner, having a melting point of 91° to 92°.

*Example 2*

150 parts of chloroform are introduced into a glass vessel containing 5 parts of catalytic nickel (Raney). The contents of the vessel are cooled indirectly, moisture is excluded, and 6.3 parts (0.15 mol) of propylene are introduced at atmospheric pressure, followed by 6.5 parts (0.1 mol) of nitrosyl chloride. The contents of the vessel are maintained at a temperature of −22°, at atmospheric pressure, for a period of about 24 hours. The reaction mixture is then concentrated as described in Example 1, and the crystalline addition product is isolated and purified in a similar manner. The yield of bis-propylene nitroso chloride obtained is of the same order as that recovered in the preceding example.

*Example 3*

Propylene and nitrosyl chloride are reacted at atmospheric pressure in a glass vessel in chloroform, using the proportions and temperatures of Example 2, but substituting 30 parts by weight of nickel turnings for the catalytically active nickel specified in the preceding example. The reaction is allowed to continue for about 20 hours. Crystalline bis-propylene nitroso-chloride is recovered by working up the reaction mixture in the same manner as in the foregoing examples.

*Example 4*

490 parts of methylene chloride are placed in a nickel bomb and indirectly cooled by means of "dry ice." 25.2 parts (0.6 mol) of propylene and 6.5 parts (0.1 mol) of nitrosyl chloride are added, and the bomb is sealed. The temperature is raised to about 20° and this temperature is maintained for about 1½ hours. Crystalline bis-propylene nitroso chloride is isolated from the reaction mixture in the manner described in Example 1.

*Example 5*

335 parts of methylene chloride are placed in a nickel bomb, and indirectly cooled by means of "dry ice." 14 parts (0.5 mol) of ethylene are introduced through a flow meter and 6.5 parts (0.1 mol) of liquid nitrosyl chloride are added. After sealing the bomb, the temperature is raised to about 40° and this temperature maintained for about 3½ hours with frequent shaking to establish equilibrium. The bomb is then cooled to room temperature, the pressure is released, the reaction mixture is removed, and the methylene chloride is evaporated under reduced pressure at a temperature of about 25°. Upon cooling the residual blue-green liquid by means of an ice bath for at least one hour, crystalline bis-ethylene nitroso chloride separates, and is recovered by filtration in the form of a filter cake. The latter is washed with 80% ethanol at about 0°. If desired, the product may be further purified by recrystallization from carbon tetrachloride, whereby a purified product having a melting point of 71° to 72° is obtained.

*Example 6*

0.98 part (0.015 mol) of nitrosyl chloride are added to 16 parts of carbon tetrachloride in the presence of an excess of nickel chloride, and the mixture is agitated until it is saturated with the resulting nitrosyl chloride-nickel chloride complex. 12 parts of chloroform are placed in a heavy-walled glass vessel and indirectly cooled with "dry ice." The saturated carbon tetrachloride solution of the nitrosyl chloride-nickel chloride complex is added to the chloroform and 1.26 parts (0.03 mol) of propylene introduced. The vessel is sealed and the temperature raised to 20°. After maintaining this temperature for about 2 hours, while agitating to establish equilibrium, the pressure is released, and the solvents removed by evaporation under reduced pressure at about 25°. Upon cooling the residual liquid by means of an ice bath, crystalline bis-propylene nitrosochloride separates, and is recovered by filtration in the form of filter cake, which is then washed with cold 80% ethanol as in Example 1.

*Example 7*

Propylene is reacted with nitrosyl chloride in the presence of a solution of the nitrosyl chloride-nickel chloride complex in a mixture of carbon tetrachloride and chloroform as in the preceding example, with the exception that the reaction temperature employed is 60°. Crystalline bis-propylene nitroso-chloride is recovered in somewhat lower yields than those obtained according to Example 6.

*Example 8*

Propylene is reacted with nitrosyl chloride under the same conditions as in Example 6, except that ferric chloride is substituted for nickel chloride. Crystalline bis-propylene nitroso-chloride is recovered in the manner described in Example 6.

*Example 9*

150 parts of chloroform are introduced into a nickel bomb and 0.99 part (0.01 mol) of solid cuprous chloride is added. 6.5 parts (0.1 mol) of nitrosyl chloride and 12.6 parts (0.3 mol) of propylene are introduced, and the bomb is sealed. The temperature is then raised to 40° and maintained at this temperature for 20 minutes, with constant agitation. The pressure is then released and the reaction mixture worked up as in Example 1 to recover crystalline bis-propylene nitroso-chloride.

*Example 10*

A mixture of 16 parts of carbon tetrachloride and 12 parts of chloroform are placed in a heavy-walled glass vessel, and cooled by means of "dry ice" while excluding moisture. 0.98 part (0.015 mol) of nitrosyl chloride and 1.26 parts (0.03 mol) of propylene are introduced, and the vessel is sealed. The temperature is raised to 20° and maintained at this temperature for about two hours. The pressure is then released and the solvents evaporated under reduced pressure. The blue-green liquid residue is cooled as described in Example 1, and the crystalline bis-propylene nitroso-chloride thereby precipitated is recovered as in the foregoing examples.

Variations and modifications may be made within the scope of the invention, and accordingly the foregoing examples are to be interpreted as illustrative rather than in a limiting sense.

I claim:

1. A process for the production of a crystalline nitrosyl chloride addition product of an olefin having a maximum of 3 carbon atoms, which comprises reacting said olefin with nitrosyl chloride at a temperature from —25° C. to 60° C., in the liquid phase, while in solution in a volatile saturated halogenated hydrocarbon which is a solvent for the olefin and the nitrosyl chloride, and crystallizing the nitrosyl chloride addition product from the reaction mixture.

2. A process for the production of a crystalline nitrosyl chloride addition product of an olefin having a maximum of 3 carbon atoms, which comprises reacting said olefin with nitrosyl chloride at a temperature from —25° C. to 60° C., in the liquid phase, in the presence of at least 5 parts by volume of a volatile saturated chlorinated hydrocarbon as a solvent, per part by weight of nitrosyl chloride, concentrating the less volatile constituents of the reaction mixture, and cooling the concentrated mixture to effect crystallization.

3. A process for the production of a crystalline nitrosyl chloride addition product of an olefin having a maximum of 3 carbon atoms, which comprises reacting said olefin with nitrosyl chloride at a temperature from −25° C. to 60° C., in the liquid phase, while in solution in a volatile saturated halogenated hydrocarbon which is a solvent for the olefin and the nitrosyl chloride, in the presence of a nickel catalyst, and crystallizing the nitrosyl chloride addition product from the reaction mixture.

4. A process for the production of a crystalline nitrosyl chloride addition product of an olefin having a maximum of 3 carbon atoms, which comprises reacting said olefin with nitrosyl chloride at a temperature from −25° C. to 60° C., in the liquid phase, while in solution in a volatile saturated halogenated hydrocarbon which is a solvent for the olefin and the nitrosyl chloride, in the presence of metallic nickel as a catalyst, and crystallizing the nitrosyl chloride addition product from the reaction mixture.

5. A process for the production of a crystalline nitrosyl chloride addition product of an olefin having a maximum of 3 carbon atoms, which comprises reacting said olefin with nitrosyl chloride at a temperature from −25° C. to 60° C., in the liquid phase, while in solution in a volatile saturated halogenated hydrocarbon which is a solvent for the olefin and the nitrosyl chloride, in the presence of activated metallic nickel as a catalyst, and crystallizing the nitrosyl chloride addition product from the reaction mixture.

6. A process for the production of a crystalline nitrosyl chloride addition product of an olefin having a maximum of 3 carbon atoms, which comprises reacting said olefin with nitrosyl chloride at a temperature from −25° C. to 60° C., in the liquid phase, while in solution in a volatile saturated halogenated hydrocarbon which is a solvent for the olefin and the nitrosyl chloride, in the presence of a heavy metal chloride as a catalyst, and crystallizing the nitrosyl chloride addition product from the reaction mixture.

7. A process for the production of a crystalline nitrosyl chloride addition product of an olefin having a maximum of 3 carbon atoms, which comprises reacting said olefin with nitrosyl chloride at a temperature from −25° C. to 60° C., in the liquid phase, while in solution in a volatile saturated halogenated hydrocarbon which is a solvent for the olefin and the nitrosyl chloride, in the presence of a complex addition product of a heavy metal chloride and a nitrosyl chloride as a catalyst, and crystallizing the nitrosyl chloride addition product from the reaction mixture.

8. A process for the production of a crystalline nitrosyl chloride addition product of an olefin containing a maximum of 3 carbon atoms, which comprises reacting said olefin with nitrosyl chloride, in the liquid phase, while in solution in a volatile saturated halogenated hydrocarbon which is a solvent for the olefin and the nitrosyl chloride and in the presence of a nickel catalyst, at a temperature of 20° to 40° C., concentrating the less volatile constituents of the reaction mixture, cooling the concentrated mixture to effect crystallization, and separating the resulting crystals from the mother liquor.

9. A process for the production of a crystalline nitrosyl chloride addition product of an olefin containing a maximum of 3 carbon atoms, which comprises reacting at least 1 mol of said olefin with 1 mol of nitrosyl chloride in the presence of a polychlor methane as a solvent medium at a temperature from −25° to 60° C., concentrating the less volatile constituents of the reaction mixture, cooling the concentrated mixture to effect crystallization of the olefin nitrosyl chloride addition product, and separating the resulting crystals from the mother liquor.

10. A process for the production of a crystalline nitrosyl chloride addition product of an olefin containing a maximum of 3 carbon atoms, which comprises reacting at least one mol of said olefin with 1 mol of nitrosyl chloride, in the liquid phase, in the presence of a polychlor methane as a solvent medium and in the presence of metallic nickel as a catalyst, at a temperature of 20° to 40° C. under superatmospheric pressure, concentrating the less volatile constituents of the reaction mixture, cooling the concentrated mixture to effect crystallization, and separating the resulting crystals from the mother liquor.

11. A process for the production of crystalline bispropylene nitroso-chloride, which comprises reacting propylene with nitrosyl chloride, in the liquid phase, in the presence of a polychlor methane as a solvent medium and in the presence of metallic nickel as a catalyst, at a temperature of 20° to 40° C. under superatmospheric pressure, evaporating the solvent from the reaction mixture at a temperature not substantially exceeding 25° C., cooling the blue-green liquid residue to effect crystallization, and separating the resulting crystals from the mother liquor.

12. A process for the production of crystalline bisethylene nitroso-chloride, which comprises reacting ethylene with nitrosyl chloride, in the liquid phase, in the presence of methylene chloride as a solvent medium and in the presence of metallic nickel as a catalyst, at a temperature of 20° to 40° C. under superatmospheric pressure, evaporating the solvent from the reaction mixture at a temperature not substantially exceeding 25° C., cooling the blue-green liquid residue to effect crystallization, and separating the resulting crystals from the mother liquor.

13. Crystalline bis-propylene nitroso chloride, having a melting point of 91° to 92° C. when recrystallized from carbon tetrachloride.

14. Crystalline bis-ethylene nitroso chloride, having a melting point of 71° to 72° C. when recrystallized from carbon tetrachloride.

15. A process for the production of a crystalline nitrosyl chloride addition product of propylene, which comprises reacting at least one mol of propylene with one mol of nitrosyl chloride at a temperature from −25° C. to 60° C. in the liquid phase while in solution in a volatile saturated halogenated hydrocarbon which is a solvent for propylene and nitrosyl chloride, and crystallizing the propylene nitrosyl chloride addition product from the reaction mixture.

16. A process for the production of a crystalline nitrosyl chloride addition product of propylene, which comprises reacting propylene with nitrosyl chlorides, at a temperature from −25° to 60° C., in the liquid phase while in solution in a volatile saturated halogenated hydrocarbon which is a solvent for propylene and nitrosyl chloride, in the presence of a nickel catalyst, and crystallizing the nitrosyl chloride addition product from the reaction mixture.

17. A process for the production of a crystalline nitrosyl chloride addition product of propylene, which comprises reacting propylene with nitrosyl chloride, at a temperature from −25° C. to 60° C., in the liquid phase while in solution in a volatile saturated halogenated hydrocarbon which is a solvent for propylene and nitrosyl chloride, in the presence of a heavy metal chloride as a catalyst, and crystallizing the nitrosyl chloride addition product from the reaction mixture.

18. The crystalline bis-nitroso chloride of an olefin containing a maximum of 3 carbon atoms, said bis-nitroso-chloride having a melting point between 71° C. and 92° C. when recrystallized from carbon tetrachloride.

LELAND JAMES BECKHAM.

REFERENCES CITED

The following references are of record in the file of this patent:

Tilden et al., "Jour. Chem. Soc." vol. 63, (1893), pp. 479–81.

Tilden et al., "Jour. Chem. Soc." vol. 65, (1894), pp. 324–334.

Rheinboldt, "Annalen," vol. 451, pp. 273–281 (1927).